US008921761B2

United States Patent
Tsai

(10) Patent No.: US 8,921,761 B2
(45) Date of Patent: Dec. 30, 2014

(54) OPTICAL DECODER AND MULTI-FUNCTIONAL PRINTER USING THE SAME

(75) Inventor: Ting-Shi Tsai, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 227 days.

(21) Appl. No.: 13/556,153

(22) Filed: Jul. 23, 2012

(65) Prior Publication Data

US 2013/0264471 A1 Oct. 10, 2013

(30) Foreign Application Priority Data

Apr. 10, 2012 (TW) .............................. 101112639 A

(51) Int. Cl.
*G01D 5/347* (2006.01)
(52) U.S. Cl.
USPC ................ 250/231.1; 250/237 G; 250/231.13
(58) Field of Classification Search
USPC ............................. 250/231.13–231.18, 237 G
See application file for complete search history.

(56) References Cited

U.S. PATENT DOCUMENTS

| 4,343,998 | A | * | 8/1982 | Mori | 250/559.42 |
| 4,786,803 | A | * | 11/1988 | Majette et al. | 250/237 G |
| 6,240,652 | B1 | * | 6/2001 | Bobel et al. | 33/707 |
| 8,395,535 | B2 | * | 3/2013 | Kawada | 341/13 |

FOREIGN PATENT DOCUMENTS

| TW | M368544 | 11/2009 |
| TW | I338627 | 3/2011 |

* cited by examiner

*Primary Examiner* — Tony Ko
(74) *Attorney, Agent, or Firm* — Jianq Chyun IP Office

(57) ABSTRACT

An optical decoder and a multi-functional printer using the same are provided. The optical decoder includes a directional light source, a light guide bar and a light receiving unit. The light guide bar disposed on a light-emitting side of the directional light source has multiple scales. The light receiving unit is disposed on a side of the light guide bar, wherein the directional light source and the light receiving unit are disposed on different sides of the light guide bar. The light receiving unit is used to move along the light guide bar and read the scales of the light guide bar. The overall volume of a multi-functional printer can be reduced by applying the optical decoder therein.

8 Claims, 2 Drawing Sheets

OPTICAL DECODER AND
MULTI-FUNCTIONAL PRINTER USING THE
SAME

CROSS-REFERENCE TO RELATED APPLICATION

This application claims the priority benefit of Taiwan application serial no. 101112639, filed on Apr. 10, 2012. The entirety of the above-mentioned patent application is hereby incorporated by reference herein and made a part of this specification.

BACKGROUND OF THE INVENTION

1. Field of the Invention

The invention relates to an optical decoder and a multi-functional printer, and more particularly to an optical decoder and a multi-functional printer capable of reducing step operation generated errors as well as improving accuracy.

2. Description of Related Art

FIG. 1 is a schematic sectional view of a conventional multi-functional printer. Referring to FIG. 1, a motor 110 drives a gear 120 and a timing belt 130 when a piece of paper is sent to a printing platform. An inkjet head 140 also moves since a bearing seat 150 of the inkjet head 140 is connected to the timing belt 130. Learning that the inkjet head 140 reaches the printing area via signals of a strip 160 and an optical encoder 170, an electronic system initiates a printing process.

FIG. 2 is a schematic view of the strip and the optical decoder of FIG. 1. Referring to FIG. 2, the conventional strip 160 is formed with translucent and opaque areas arranged in a staggered pattern thereon. Moreover, the strip 160 is in a striped configuration or a plating configuration. The optical encoder 170 includes a light emitting element 172 and a light receiving unit 174. The strip 160 is placed between the light emitting element 172 and the light receiving unit 174.

When the opaque areas of the strip 160 pass through the optical encoder 170, light emitted from the light emitting element 172 cannot penetrate the opaque areas. As a result, the light receiving unit 174 produces no signal. However, light emitted from the light emitting element 172 penetrates the translucent areas when the translucent areas of the strip 160 pass through the optical encoder 170. The light receiving unit 174 produces signals accordingly Space needs to be reserved to accommodate the strip 160 and the optical encoder 170 in the multi-functional printer since the strip 160 needs to be placed between the light emitting element 172 and the light receiving unit 174. As a result, the overall volume of the multi-functional printer can't be reduced effectively.

SUMMARY OF THE INVENTION

The invention provides an optical decoder capable of reducing step operation generated errors as well as improving accuracy as compared to the conventional optical decoder.

The invention provides a multi-functional printer whose overall volume is reduced effectively.

The invention provides an optical decoder including a directional light source, a light guide bar and a light receiving unit. The light guide bar is disposed on a light-emitting side of the directional light source and has multiple scales. The light receiving unit is disposed on a side of the light guide bar wherein the directional light source and the light receiving unit are on different sides of the light guide bar. The light receiving unit is adapted to move along the light guide bar and to read the scales thereon.

In an embodiment of the optical decoder of the invention, the directional light source is a light-emitting diode.

In an embodiment of the optical decoder of the invention, the light receiving unit is a photoelectric transistor.

In an embodiment of the optical decoder of the invention, an adhesion layer is included and adhered to the light guide bar wherein the adhesion layer and the light receiving unit are on opposite sides of the light guide bar.

The invention further provides a multi-functional printer including a body, a guiding rod, a bearing seat and an optical decoder. The body has a first sidewall and a second sidewall both of which are perpendicularly interconnected. The guiding rod is pivoted on the second sidewall. An axial of the guiding rod is parallel to a normal direction of the second sidewall. The bearing seat is disposed on the guiding rod and adapted to move back and forth on the guiding rod along the axial of the guiding rod. The optical decoder includes a directional light source, a light guide bar and a light receiving unit. The directional light source is disposed on the second sidewall. The light guide bar is disposed on the first sidewall and located on a light-emitting side of the directional light source, and the light guide bar has multiple scales. The light receiving unit is disposed on the bearing seat, wherein the light guide bar is placed between the first sidewall and the light receiving unit. The light receiving unit moves along the light guide bar and reads the scales thereon as the bearing seat moves on the guiding rod along the axial of the guiding rod.

In an embodiment of the multi-functional printer of the invention, the directional light source of the optical decoder is a light-emitting diode.

In an embodiment of the multi-functional printer of the invention, the light receiving unit of the optical decoder is a photoelectric transistor.

In an embodiment of the multi-functional printer of the invention, the optical decoder further includes an adhesion layer adhered between the light guide bar and the first sidewall.

Based on the above, the light receiving unit directly reads the scales of the light guide bar since the light guide bar with multiple scales is used instead of the conventional strip in the optical decoder and the multi-functional printer using the optical decoder; consequently, accuracy is improved by reducing step operation generated errors. Moreover, the light guide bar is directly fixed on the sidewall of the body so that the space required to dispose the conventional strip and the optical encoder is reduced, further reducing the overall volume of the product effectively.

Reference will now be made in detail to the present preferred embodiments of the invention, examples of which are illustrated in the accompanying drawings. Wherever possible, the same reference numbers are used in the drawings and the description to refer to the same or like parts.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 3:
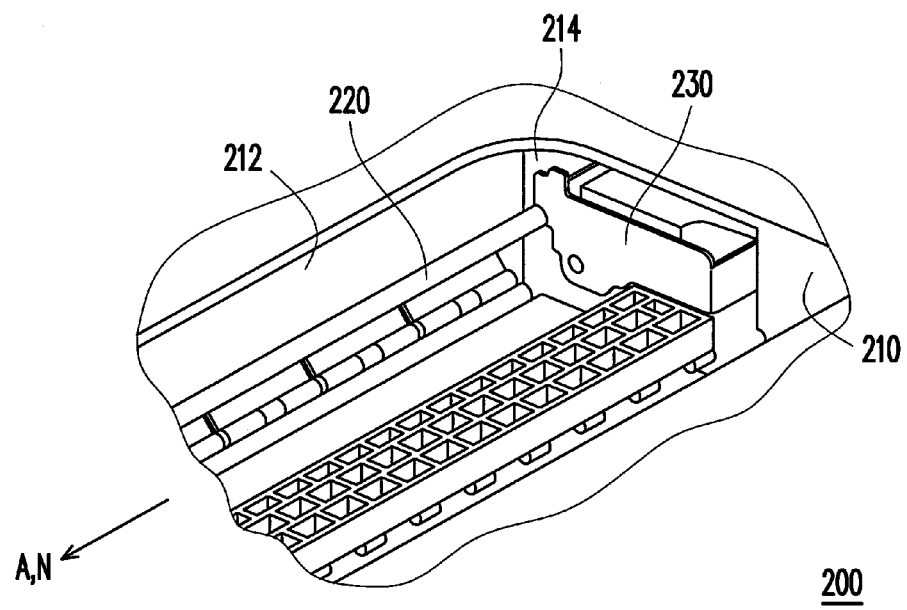
FIG. 3 is a schematic view of a multi-functional printer of the invention.
Figure 4:
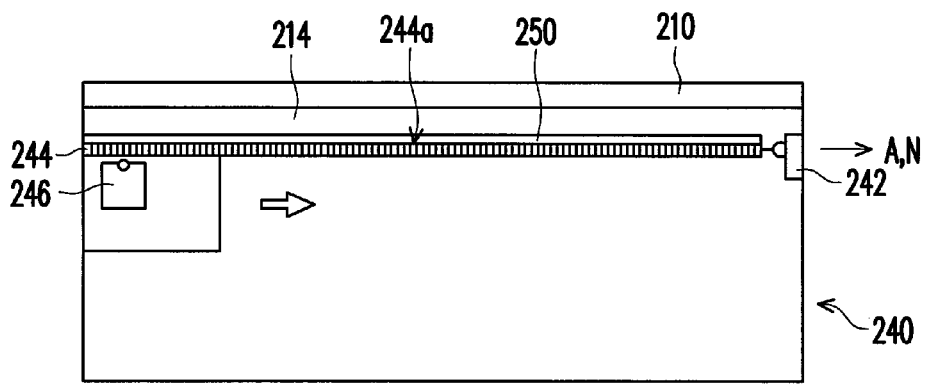
FIG. 4 is a schematic view of an optical decoder applied in a multi-functional printer.

FIG. 3 is a schematic view of a multi-functional printer of the invention. FIG. 4 is a schematic view of an optical decoder applied in the multi-functional printer. Referring to FIGS. 3 and 4, the multi-functional printer 200 of this embodiment includes a body 210, a guiding rod 220, a bearing seat 230 and an optical decoder 240. The body 210 has a first sidewall 212 and a second sidewall 214 both of which are perpendicularly interconnected. The guiding rod 220 is pivoted on the second sidewall 214. An axial A of the guiding rod 220 is parallel to a normal direction N of the second sidewall 214. The bearing seat 230 is disposed on the guiding rod 220 and adapted to move back and forth on the guiding rod 220 along the axial A of the guiding rod 220. The optical decoder 240 includes a directional light source 242, a light guide bar 244 and a light receiving unit 246. The directional light source 242 is disposed on the second sidewall 214. The light guide bar 244 is disposed on the first sidewall 212 and located on a light-emitting side of the directional light source 242, and the light guide bar 244 has multiple scales 244a. The light receiving unit 246 is disposed on the bearing seat 230, wherein the light guide bar 244 is placed between the first sidewall 212 and the light receiving unit 246.

In the multi-functional printer 200 of this embodiment, the directional light source 242 is directly disposed on the second sidewall 214 while the light guide bar 244 is directly disposed on the first sidewall 212 of the body 210 and located on the light-emitting side of the directional light source 242. The light guide bar 244 with the scales 244a is used instead of the conventional strip 160 therein (shown in FIG. 2). The light receiving unit 246 directly reads the scales 244a of the light guide bar 244. Briefly speaking, in this embodiment, the optical decoder 240 is used to replace the conventional optical encoder 170, thereby improving the detection accuracy effectively and reducing the overall volume of the multi-functional printer 200.

Referring to FIGS. 3 and 4 again, the directional light source 242 of the optical decoder 240 is a light-emitting diode while the light receiving unit 246 of the optical decoder 240 is a photoelectric transistor. Furthermore, the optical decoder 240 further includes an adhesion layer 250 adhered between the light guide bar 244 and the first sidewall 212 to fix the light guide bar 244 to the first sidewall 212. Though the light guide bar 244 is fixed to the first sidewall 212 by adhesion in this embodiment, designers can fix the light guide bar 244 to the first sidewall 212 by tight combination, hook or other methods in response to demands in other embodiments not shown in the accompanying drawings.

In printing process, a paper feeding device of the multi-functional printer 200 feeds a sheet of paper into a transporting channel to be delivered. A motor of the multi-functional printer 200 drives gears and a timing belt thereon to rotate when the paper reaches a printing platform of the multi-functional printer 200. Since the bearing seat 230 of the multi-functional printer 200 is linked to the timing belt, the bearing seat 230 moves with the rotating of the bearing seat 230. The optical decoder 240 is used to detect whether the bearing seat 230 is positioned in a printing area. The paper feeding device, printing platform, motor, gears and timing belt are familiar to one of ordinary skill in the art of the multi-functional printer 200. Hence, illustrations are not shown here, and full descriptions of relative positions are not provided.

More particularly, the directional light source 242 emits a light. The light guide bar 244, disposed on the light-emitting side of the directional light source 242, receives the light emitted from the directional light source 242 and guides the light towards a desired direction. Since the light is transmitted in the light guide bar 244, the whole light guide bar 244 glows, and the scales 244a of the light guide bar 244 are clearly readable. Herein, the bearing seat 230 moves along the axial A on the guide rod 220 while the light receiving unit 246 also moves along the light guide bar 244 with the bearing seat 230 and simultaneously reads the scales 244a of the light guide bar 244. Results that are read are passed back to a motherboard of the multi-functional printer 200 to determine whether to perform printing on the paper.

Figure 1:
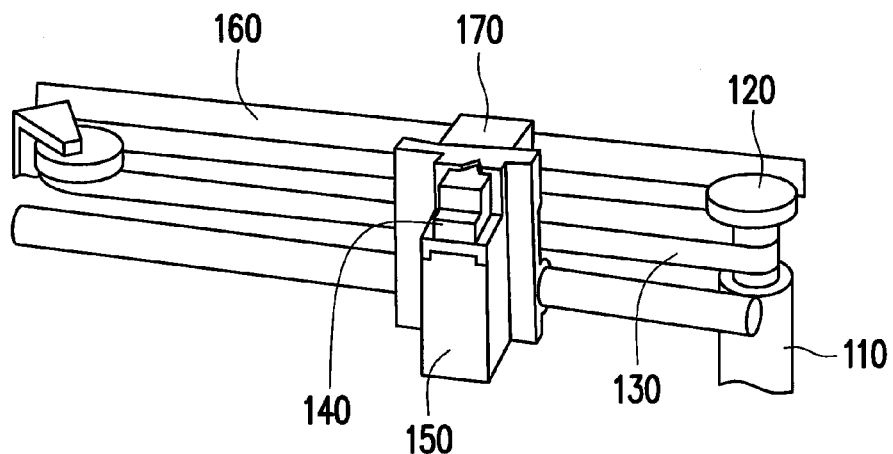
FIG. 1 is a schematic sectional view of a conventional multi-functional printer.
Figure 2:
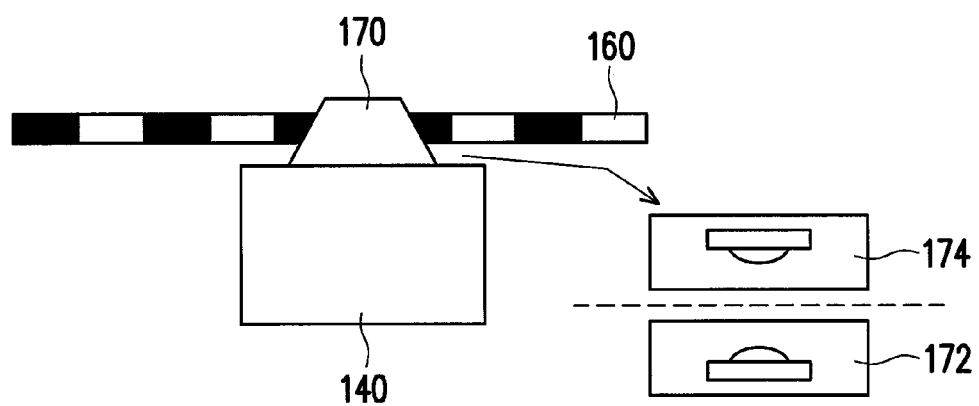
FIG. 2 is a schematic view of a strip and an optical decoder of FIG. 1.

As shown in FIG. 2, the strip 160 and the optical encoder 170 disposed in the conventional multi-functional printer detect the position of the bearing seat to determine whether to begin printing. The strip 160 and the optical encoder 170 require a certain amount of space to be disposed in the conventional multi-functional printer so that the strip 160 can be placed between a lighting element 172 of the optical encoder 170 and the light receiving unit 174. Between the strip 160 and the lighting element 172 or the light receiving unit 174, electronic elements that may block light transmission can't be disposed. In other words, some space is wasted in the conventional multi-functional printer. In addition, the action principle and circuit layout of the strip 160 and the optical encoder 170 are relatively complex, thus increasing the cost of the design.

On the other hand, in the multi-functional printer 200 of this embodiment, the directional light source 242 is directly disposed on the second sidewall 214 while the light guide bar 244 is directly disposed on the first sidewall 212 of the body 210 and located on the light-emitting side of the directional light source 242. The light receiving unit 246, which is a photoelectric transistor, moves with the bearing seat 230 and directly reads the scales 244a of the light guide bar 244. Since the directional light source 242 and the light guide bar 244 are fixed, only the light receiving unit 246 relatively moves. As a result, errors are reduced by reading of the scales 244a of the light guide bar 244 to improve accuracy as compared to the conventional technique utilizing step operation. Moreover, the light guide bar 244 is directly fixed on the first sidewall 212 without the need to be disposed with additional elements in the body 210. As a result, the space required to dispose the strip is spared in the multi-functional printer 200, which allows the designers to flexibly allocate additional elements in the body. Alternatively, the overall volume of the multi-functional printer 200 is reduced effectively.

In summary, in the optical decoder and the multi-functional printer using the optical decoder of the invention, the light guide bar with scales is used instead of the conventional strip and thus the light receiving unit moving with the bearing seat reads the scales of the light guide bar directly. Accordingly, conventional step operation generated errors are reduced, thus improving accuracy.

Moreover, the directional light source and the light guide bar are directly fixed on the sidewall of the body. Hence, the amount of space required to accommodate the stripe and the optical encoder in the body is reduced. More flexible allocation of other elements in the body is allowed. Alternatively, the overall volume of the product is reduced effectively.

Though the above embodiments have disclosed the invention, they are not intended to limit the invention. Modifications and alterations may be made by one of ordinary skill in the art without departing from the spirit and scope of the invention. Therefore, the protection scope of the invention falls in the appended claims.

What is claimed is:

1. An optical decoder, comprising:
   a directional light source;
   a light guide bar disposed on a light-emitting side of the directional light source and comprising a plurality of scales; and
   a light receiving unit disposed on a side of the light guide bar, wherein the directional light source and the light receiving unit are on two sides of the light guide bar which are perpendicular to each other, and the light receiving unit is adapted to move along the light guide bar and to read the scales on the light guide bar.

2. The optical decoder according to claim 1, wherein the directional light source is a light-emitting diode.

3. The optical decoder according to claim 1, wherein the light receiving unit is a photoelectric transistor.

4. The optical decoder according to claim 1, further comprising an adhesion layer adhered to the light guide bar, wherein the adhesion layer and the light receiving unit are on opposite sides of the light guide bar.

5. A multi-functional printer, comprising:
   a body comprising a first sidewall and a second sidewall both of which are perpendicularly interconnected;
   a guiding rod pivoted on the second sidewall, an axial of the guiding rod being parallel to a normal direction of the second sidewall;
   a bearing seat disposed on the guiding rod and adapted to move back and forth on the guiding rod along the axial of the guiding rod; and
   an optical decoder, comprising:
   a directional light source disposed on the second sidewall;
   a light guide bar disposed on the first sidewall and located on a light-emitting side of the directional light source, and the light guide bar comprising a plurality of scales; and
   a light receiving unit disposed on the bearing seat, wherein the light guide bar is placed between the first sidewall and the light receiving unit, and the light receiving unit moves along the light guide bar and reads the scales on the light guide bar as the bearing seat moves along the axial on the guiding rod.

6. The multi-functional printer according to claim 5, wherein the directional light source of the optical decoder is a light-emitting diode.

7. The multi-functional printer according to claim 5, wherein the light receiving unit of the optical decoder is a photoelectric transistor.

8. The multi-functional printer according to claim 5, wherein the optical decoder further comprises an adhesion layer adhered between the light guide bar and the first sidewall.

* * * * *